US010484927B2

(12) United States Patent
McHenry et al.

(10) Patent No.: US 10,484,927 B2
(45) Date of Patent: Nov. 19, 2019

(54) METHOD AND DEVICE FOR POLICY-BASED CONTROL OF RADIO

(71) Applicant: SHARED SPECTRUM COMPANY, Vienna, VA (US)

(72) Inventors: Mark Allen McHenry, McLean, VA (US); Filip Perich, Annapolis, MD (US); Peter Tenhula, Alexandria, VA (US)

(73) Assignee: Shared Spectrum Company, Vienna, VA (US)

( * ) Notice: Subject to any disclaimer, the term of this patent is extended or adjusted under 35 U.S.C. 154(b) by 0 days.

(21) Appl. No.: 14/636,328

(22) Filed: Mar. 3, 2015

(65) Prior Publication Data
US 2015/0189572 A1 Jul. 2, 2015

Related U.S. Application Data

(63) Continuation of application No. 11/783,563, filed on Apr. 10, 2007, now Pat. No. 8,997,170.
(Continued)

(51) Int. Cl.
*H04W 48/02* (2009.01)
*H04L 29/06* (2006.01)
(Continued)

(52) U.S. Cl.
CPC ............ *H04W 48/02* (2013.01); *H04L 63/20* (2013.01); *H04W 8/245* (2013.01);
(Continued)

(58) Field of Classification Search
None
See application file for complete search history.

(56) References Cited

U.S. PATENT DOCUMENTS 3,893,064 A 7/1975 Nishihara
3,935,572 A 1/1976 Broniwitz
(Continued)

FOREIGN PATENT DOCUMENTS

EP 1220499 A2 7/2002
EP 1571861 9/2005
(Continued)

OTHER PUBLICATIONS

European Patent Office, European Examination Report in Application No. PCT/US2007/022356, dated Oct. 30, 2013.
(Continued)

*Primary Examiner* — Zhiyu Lu
(74) *Attorney, Agent, or Firm* — Morris & Kamlay LLP

(57) ABSTRACT

A device is disclosed that includes software components for executing actions and for controlling the device in order to conform to specified policies. The device includes a controller to deny or permit execution of actions. The controller monitors and interrupts execution of device's actions in order to determine whether an action violates a policy, policy rules, or if the action is prohibited by a policy. The controller also manages policies defined for the device. Each policy is translated into a language understandable by the controller and stored on the device. Each policy can be updated or changed dynamically. Additionally, each policy can securely be updated or changed remotely.

19 Claims, 5 Drawing Sheets

Related U.S. Application Data

(60) Provisional application No. 60/877,656, filed on Dec. 29, 2006.

(51) Int. Cl.
   *H04W 8/24* (2009.01)
   *H04W 28/04* (2009.01)
   *H04W 74/08* (2009.01)

(52) U.S. Cl.
   CPC .......... *H04L 63/205* (2013.01); *H04W 28/04* (2013.01); *H04W 74/085* (2013.01)

(56) References Cited

U.S. PATENT DOCUMENTS

| | | | |
|---|---|---|---|
| 4,107,613 | A | 8/1978 | Queen |
| 4,119,964 | A | 10/1978 | Fletcher |
| 4,227,255 | A | 10/1980 | Carrick |
| 4,305,150 | A | 12/1981 | Richmond |
| 4,398,220 | A | 8/1983 | Satoh |
| 4,501,020 | A | 2/1985 | Wakeman |
| 4,672,657 | A | 6/1987 | Dershowitz |
| 4,736,453 | A | 4/1988 | Schloemer |
| 4,783,780 | A | 11/1988 | Alexis |
| 4,803,703 | A | 2/1989 | DeLuca |
| 4,878,238 | A | 10/1989 | Rash |
| 4,881,271 | A | 11/1989 | Yamauchi |
| 4,918,730 | A | 4/1990 | Schulze |
| 4,977,612 | A | 12/1990 | Wilson |
| 5,040,238 | A | 8/1991 | Comroe |
| 5,065,334 | A | 11/1991 | Taylor |
| 5,093,924 | A | 3/1992 | Toshiyuki |
| 5,093,927 | A | 3/1992 | Shanley |
| 5,142,691 | A | 8/1992 | Freeburg |
| 5,151,747 | A | 9/1992 | Nourrcier |
| 5,155,590 | A | 10/1992 | Beyers, II |
| 5,162,937 | A | 11/1992 | Heidemann |
| 5,177,604 | A | 1/1993 | Martinez |
| 5,177,767 | A | 1/1993 | Kato |
| 5,177,804 | A | 1/1993 | Shimizu |
| 5,179,722 | A | 1/1993 | Gunmar |
| 5,203,012 | A | 4/1993 | Patsiokas |
| 5,225,902 | A | 7/1993 | McMullan, Jr. |
| 5,239,676 | A | 8/1993 | Strawczynski |
| 5,247,701 | A | 9/1993 | Comroe |
| 5,260,974 | A | 11/1993 | Johnson |
| 5,271,036 | A | 12/1993 | Lobert |
| 5,276,906 | A | 1/1994 | Felix |
| 5,276,908 | A | 1/1994 | Koohgoli |
| 5,325,088 | A | 6/1994 | Willard |
| 5,375,123 | A | 12/1994 | Andersson |
| 5,402,523 | A | 3/1995 | Berg |
| 5,410,737 | A | 4/1995 | Jon Es |
| 5,412,658 | A | 5/1995 | Arnold |
| 5,422,912 | A | 6/1995 | Asser |
| 5,422,930 | A | 6/1995 | McDonald |
| 5,428,819 | A | 6/1995 | Wang |
| 5,448,753 | A | 9/1995 | Ahl |
| 5,475,868 | A | 12/1995 | Duque-Anton |
| 5,497,505 | A | 3/1996 | Koohgoli |
| 5,502,688 | A | 3/1996 | Recchione |
| 5,511,233 | A | 4/1996 | Otten |
| 5,548,809 | A | 8/1996 | Lemson |
| 5,553,081 | A | 9/1996 | Downey |
| 5,585,850 | A | 12/1996 | Schwaller |
| 5,608,727 | A | 3/1997 | Perreault |
| 5,655,217 | A | 8/1997 | Lemson |
| 5,668,747 | A | 9/1997 | Ohashi |
| 5,748,678 | A | 5/1998 | Valentine |
| 5,752,164 | A | 5/1998 | Jon Es |
| 5,794,151 | A | 8/1998 | McDonald |
| 5,822,686 | A | 10/1998 | Lundberg |
| 5,828,948 | A | 10/1998 | Almgren |
| 5,850,605 | A | 12/1998 | Souissi |
| 5,862,487 | A | 1/1999 | Fujii |
| 5,884,181 | A | 3/1999 | Arnold |
| 5,889,821 | A | 3/1999 | Arnstein |
| 5,939,887 | A | 8/1999 | Schmidt |
| 5,943,622 | A | 8/1999 | Yamashita |
| 5,950,110 | A | 9/1999 | Hendrickson |
| 5,960,351 | A | 9/1999 | Przelomiec |
| 5,966,351 | A | 10/1999 | Carleton |
| 5,999,561 | A | 12/1999 | Naden |
| 6,011,970 | A | 1/2000 | McCarthy |
| 6,044,090 | A | 3/2000 | Grau |
| 6,047,175 | A | 4/2000 | Trompower |
| 6,049,707 | A | 4/2000 | Buer |
| 6,049,717 | A | 4/2000 | Dufour |
| 6,141,557 | A | 10/2000 | Dipiazza |
| 6,147,553 | A | 11/2000 | Kolanek |
| 6,154,501 | A | 11/2000 | Friedman |
| 6,157,811 | A | 12/2000 | Dent |
| 6,167,811 | B1 | 1/2001 | Walters |
| 6,178,328 | B1 | 1/2001 | Tang |
| 6,188,873 | B1 | 2/2001 | Wickman |
| 6,208,858 | B1 | 3/2001 | Antonio |
| 6,240,274 | B1 | 5/2001 | Izadpanah |
| 6,269,331 | B1 | 7/2001 | Alanara |
| 6,295,289 | B1 | 9/2001 | Ionescu |
| 6,304,140 | B1 | 10/2001 | Thron |
| 6,356,555 | B1 | 3/2002 | Rakib |
| 6,380,879 | B2 | 4/2002 | Kober |
| 6,522,885 | B1 | 2/2003 | Tang |
| 6,526,264 | B2 | 2/2003 | Sugar |
| 6,529,715 | B1 | 3/2003 | Kitko |
| 6,570,444 | B2 | 5/2003 | Wright |
| 6,597,301 | B2 | 7/2003 | Cerra |
| 6,606,593 | B1 | 8/2003 | Jarvinen |
| 6,615,040 | B1 | 9/2003 | Benveniste |
| 6,625,111 | B1 | 9/2003 | Sudo |
| 6,644,090 | B2 | 11/2003 | Gasparini |
| 6,650,735 | B2 | 11/2003 | Burton |
| 6,671,503 | B1 | 12/2003 | Niwamoto |
| 6,675,012 | B2 | 1/2004 | Gray |
| 6,687,492 | B1 | 2/2004 | Sugar |
| 6,690,746 | B1 | 2/2004 | Sills |
| 6,696,746 | B1 | 2/2004 | Farrar |
| 6,697,013 | B2 | 2/2004 | McFarland |
| 6,697,436 | B1 | 2/2004 | Wright |
| 6,700,450 | B2 | 3/2004 | Rogers |
| 6,714,605 | B2 | 3/2004 | Sugar |
| 6,714,780 | B1 | 3/2004 | Antonio |
| 6,728,517 | B2 | 4/2004 | Sugar |
| 6,771,957 | B2 | 8/2004 | Chitrapu |
| 6,785,520 | B2 | 8/2004 | Sugar |
| 6,792,268 | B1 | 9/2004 | Benveniste |
| 6,799,020 | B1 | 9/2004 | Heidmann et al. |
| 6,816,832 | B2 | 11/2004 | Alanara |
| 6,847,678 | B2 | 1/2005 | Berezdivin |
| 6,850,735 | B2 | 2/2005 | Sugar |
| 6,850,764 | B1 | 2/2005 | Patel |
| 6,862,456 | B2 | 3/2005 | Sugar |
| 6,891,496 | B2 | 5/2005 | Husted |
| 6,904,269 | B1 | 6/2005 | Deshpande et al. |
| 6,915,530 | B1 | 7/2005 | Kauffman |
| 6,941,110 | B2 | 9/2005 | Kloper |
| 6,949,717 | B2 | 9/2005 | Haluschka |
| 6,952,563 | B2 | 10/2005 | Brown |
| 6,959,178 | B2 | 10/2005 | Macedo |
| 6,965,762 | B2 | 11/2005 | Sugar |
| 6,990,087 | B2 | 1/2006 | Rao |
| 6,993,440 | B2 | 1/2006 | Anderson |
| 7,013,345 | B1 | 3/2006 | Brown |
| 7,020,451 | B2 | 3/2006 | Sugar |
| 7,035,593 | B2 | 4/2006 | Miller |
| 7,054,625 | B2 | 5/2006 | Kawasaki |
| 7,058,383 | B2 | 6/2006 | Sugar |
| 7,089,014 | B2 | 8/2006 | Brown |
| 7,116,943 | B2 | 10/2006 | Sugar |
| 7,224,752 | B2 | 5/2007 | Sugar |
| 7,227,974 | B2 | 6/2007 | Kamijo |
| 7,254,191 | B2 | 8/2007 | Sugar |
| 7,260,156 | B2 | 8/2007 | Krupezevic |
| 7,269,151 | B2 | 9/2007 | Diener |

(56) References Cited

U.S. PATENT DOCUMENTS

| | | | |
|---|---|---|---|
| 7,292,656 B2 | 11/2007 | Kloper | |
| 7,313,393 B2 | 12/2007 | Chitrapu | |
| 7,342,876 B2 | 3/2008 | Bellur | |
| 7,424,268 B2 | 9/2008 | Diener | |
| 7,428,270 B1 | 9/2008 | Dubuc | |
| 7,430,254 B1 | 9/2008 | Anderson | |
| 7,457,295 B2 | 11/2008 | Saunders | |
| 7,463,952 B2 | 12/2008 | Bidou | |
| 7,483,700 B2 | 1/2009 | Buchwald | |
| 7,532,857 B2 | 5/2009 | Simon | |
| 7,564,816 B2 | 7/2009 | McHenry | |
| 7,606,335 B2 | 10/2009 | Kloper et al. | |
| 7,610,036 B2 | 10/2009 | Teo | |
| 7,613,148 B2 | 11/2009 | Hong | |
| 7,616,604 B2 | 11/2009 | Abdelhamid | |
| 7,742,764 B2 | 6/2010 | Gillig | |
| 7,826,839 B1 | 11/2010 | Nicholas | |
| 8,000,715 B2 | 8/2011 | Melpignano | |
| 8,086,225 B2 | 12/2011 | Lee | |
| 8,326,313 B2 | 12/2012 | McHenry | |
| 2001/0013834 A1 | 8/2001 | Yamazaki | |
| 2001/0046843 A1 | 11/2001 | Alanara | |
| 2002/0002052 A1 | 1/2002 | McHenry | |
| 2002/0002952 A1 | 1/2002 | van der lely | |
| 2002/0196842 A1 | 12/2002 | Onggosanusi | |
| 2003/0020651 A1 | 1/2003 | Crilly | |
| 2003/0027577 A1 | 2/2003 | Brown | |
| 2003/0081621 A1* | 5/2003 | Godfrey | H04L 29/06 370/400 |
| 2003/0081628 A1 | 5/2003 | Sugar | |
| 2003/0099218 A1 | 5/2003 | Tillotson | |
| 2003/0165187 A1 | 9/2003 | Tesfai | |
| 2003/0181173 A1 | 9/2003 | Sugar | |
| 2003/0181211 A1 | 9/2003 | Razavilar | |
| 2003/0181213 A1* | 9/2003 | Sugar et al. | 455/454 |
| 2003/0198200 A1* | 10/2003 | Diener et al. | 370/329 |
| 2003/0203743 A1 | 10/2003 | Sugar | |
| 2004/0002367 A1 | 1/2004 | Chanut | |
| 2004/0005858 A1 | 1/2004 | Cervinka | |
| 2004/0017268 A1 | 1/2004 | Rogers | |
| 2004/0023674 A1 | 2/2004 | Miller | |
| 2004/0028003 A1* | 2/2004 | Diener | H04L 1/0001 370/319 |
| 2004/0047324 A1 | 3/2004 | Diener | |
| 2004/0072546 A1 | 4/2004 | Sugar | |
| 2004/0121753 A1 | 6/2004 | Sugar | |
| 2004/0136466 A1 | 7/2004 | Tesfai | |
| 2004/0137915 A1 | 7/2004 | Diener | |
| 2004/0142696 A1 | 7/2004 | Saunders | |
| 2004/0199793 A1 | 10/2004 | Wilken | |
| 2004/0203474 A1 | 10/2004 | Miller | |
| 2004/0203826 A1 | 10/2004 | Sugar | |
| 2004/0219885 A1 | 11/2004 | Sugar | |
| 2004/0233972 A1 | 11/2004 | Karaoguz | |
| 2004/0253963 A1 | 12/2004 | Park | |
| 2004/0259563 A1 | 12/2004 | Morton | |
| 2005/0164648 A1 | 1/2005 | Gannholm | |
| 2005/0070294 A1 | 3/2005 | Lyle | |
| 2005/0119006 A1 | 6/2005 | Cave | |
| 2005/0192011 A1 | 9/2005 | Hong | |
| 2005/0192016 A1 | 9/2005 | Zimmermann | |
| 2005/0213560 A1 | 9/2005 | Duvvury | |
| 2005/0213580 A1 | 9/2005 | Mayer | |
| 2005/0213763 A1 | 9/2005 | Owen | |
| 2005/0270218 A1 | 12/2005 | Chiodini | |
| 2006/0015674 A1 | 1/2006 | Murotake | |
| 2006/0075467 A1 | 4/2006 | Sanda | |
| 2006/0126536 A1 | 6/2006 | Patel et al. | |
| 2006/0153281 A1 | 7/2006 | Karlsson | |
| 2006/0161428 A1 | 7/2006 | Fouret | |
| 2006/0211395 A1 | 9/2006 | Inaltho | |
| 2006/0220944 A1 | 10/2006 | Ikeda | |
| 2006/0234716 A1 | 10/2006 | Vesterinen | |
| 2006/0246836 A1 | 11/2006 | Simon | |
| 2006/0247505 A1 | 11/2006 | Siddiqui | |
| 2006/0267259 A1 | 11/2006 | Hatakeyama | |
| 2006/0270371 A1 | 11/2006 | Sugar | |
| 2007/0004358 A1 | 1/2007 | Moorti | |
| 2007/0008875 A1 | 1/2007 | Gerhardt | |
| 2007/0019603 A1 | 1/2007 | Gerhardt | |
| 2007/0046467 A1 | 3/2007 | Chakraborty | |
| 2007/0047474 A1 | 3/2007 | Anderson | |
| 2007/0047494 A1 | 3/2007 | Cordone | |
| 2007/0053410 A1 | 3/2007 | Mahonen | |
| 2007/0076745 A1 | 4/2007 | Manjeshwar | |
| 2007/0078924 A1* | 4/2007 | Hassan | G06F 21/125 709/200 |
| 2007/0091839 A1 | 4/2007 | Abdelhamid | |
| 2007/0091998 A1 | 4/2007 | Woo | |
| 2007/0100922 A1 | 5/2007 | Ashish | |
| 2007/0165577 A1 | 7/2007 | Baker | |
| 2007/0165664 A1 | 7/2007 | Gerhardt | |
| 2007/0165695 A1 | 7/2007 | Gerhardt | |
| 2007/0173199 A1 | 7/2007 | Sinha | |
| 2007/0180490 A1 | 8/2007 | Renzi | |
| 2007/0183338 A1 | 8/2007 | Singh | |
| 2007/0217371 A1 | 9/2007 | Sinha | |
| 2007/0248061 A1* | 10/2007 | Poston | H04W 72/02 370/338 |
| 2007/0253394 A1 | 11/2007 | Horiguchi | |
| 2007/0254596 A1 | 11/2007 | Corson | |
| 2008/0010040 A1 | 1/2008 | McGehee | |
| 2008/0014880 A1 | 1/2008 | Hyon | |
| 2008/0022355 A1 | 1/2008 | Khosravi | |
| 2008/0031143 A1 | 2/2008 | Ostrosky | |
| 2008/0069079 A1 | 3/2008 | Jacobs | |
| 2008/0113667 A1 | 5/2008 | Seidel | |
| 2008/0192864 A1 | 8/2008 | Szajnowski | |
| 2008/0222724 A1 | 9/2008 | Ormazabal | |
| 2008/0228446 A1 | 9/2008 | Baraniuk | |
| 2008/0259859 A1 | 10/2008 | Cordeiro | |
| 2008/0261537 A1 | 10/2008 | Chen | |
| 2008/0267259 A1 | 10/2008 | Budampati | |
| 2008/0284648 A1 | 11/2008 | Takada | |
| 2009/0040986 A1 | 2/2009 | Cordeiro | |
| 2009/0074033 A1 | 3/2009 | Kattwinkel | |
| 2009/0161610 A1 | 6/2009 | Kang | |
| 2009/0190508 A1 | 7/2009 | Kattwinkel | |
| 2009/0252178 A1 | 10/2009 | Huttunen | |
| 2010/0008312 A1 | 1/2010 | Viswanath | |
| 2010/0091701 A1 | 4/2010 | Youn et al. | |
| 2010/0220618 A1 | 9/2010 | Kwon | |
| 2010/0296076 A1 | 11/2010 | Jiang | |
| 2010/0296078 A1 | 11/2010 | Forrer | |
| 2011/0051645 A1 | 3/2011 | Hong | |
| 2014/0119244 A1 | 5/2014 | Steer et al. | |

FOREIGN PATENT DOCUMENTS

| | | |
|---|---|---|
| GB | 2260879 A | 4/1993 |
| WO | 2004054280 A2 | 6/2004 |
| WO | WO/2004/054280 A2 | 6/2004 |
| WO | 2006101489 A1 | 9/2006 |
| WO | 2007034461 A2 | 3/2007 |
| WO | 2007058490 A1 | 5/2007 |
| WO | WO/2007/058490 A1 | 5/2007 |
| WO | 2007094604 A1 | 8/2007 |
| WO | 2007096819 A2 | 8/2007 |
| WO | WO/2007/094604 A1 | 8/2007 |
| WO | WO/2007/096819 A2 | 8/2007 |
| WO | 2007108963 A2 | 9/2007 |
| WO | 2007108966 A2 | 9/2007 |
| WO | 2007109169 A2 | 9/2007 |
| WO | 2007109170 A2 | 9/2007 |
| WO | WO/2007/108963 A2 | 9/2007 |
| WO | WO/2007/108966 A2 | 9/2007 |
| WO | WO/2007/109169 A2 | 9/2007 |
| WO | WO/2007/109170 A2 | 9/2007 |

OTHER PUBLICATIONS

Mahbubani et al., "Dynamic channel allocation in wireless ad-hoc networks" May 10, 2006, pp. 1-12.

(56) References Cited

OTHER PUBLICATIONS

Project: IEEE P802.15 working group for wireless personal area networks (WPANs), Jun. 2007, pp. 1-25.
International Search Report dated Oct. 6, 2008, issued in corresponding International Application No. PCT/US07/22356, filed Oct. 19, 2007.
International Search Report dated Feb. 8, 2002, issued in corresponding International Application No. PCT/US01/14853.
International Search Report dated Mar. 18, 2008, issued in corresponding International Application No. PCT/US07/11414.
International Search Report dated Sep. 28, 2009, issued in corresponding International Application No. PCT/US08/073194.
International Search Report dated Feb. 14, 2008, issued in corresponding International Application No. PCT/US07/21940.
Ditri, Dynamic spectrum access moves to the forefront, 2008.
McHenry, XG DSA Radio System, New Frontiers in Dynamic Spectrum Access Networks, 2008.
Perich, Experimental Field Test Results on Feasibility of Declarative Spectrum Management, 3rd IEEE International Symposium on New Frontiers in Dynamic Spectrum Access Networks, 2008.
Tenhula, Update on XG and Follow-on Programs: Cognitive Radio for Tactical and Public Safety Communications, 2008.
International Search Report and Written Opinion, dated Oct. 6, 2008, issued in corresponding International Application No. PCT/US07/22356, filed Oct. 19, 2007.
Texas Instruments, "WL127x Hardware Design Guide," available at http://processors.wiki.ti.com/index.php/WL127x_Hardware_Design_Guide, Jan. 2010 (last visited Dec. 5, 2016).
Magdalena Sánchez Mora, "Experiences in the Co-Design of Software and Hardware Elements in a SDR Platform," Proceedings of the SDR '08 Technical Conference and product Exposition, 2008.
Ditri et al., "Dynamic spectrum access moves to the forefront," RFDesign, Apr. 2008.
McHenry et al, "XG DSA Radio System," 3rd IEEE Symposium on New Frontiers in Dynamic Spectrum Access Networks (DySPAN 2008), Oct. 2008. pp. 1-11.
Perich et al, Experimental Field Test Results on Feasibility of Declarative Spectrum Management, 3rd IEEE Symposium on New Frontiers in Dynamic Spectrum Access Networks (DySPAN 2008), Oct. 2008, pp. 1-10.
Tenhula, Update on XG and Follow-on Programs: Cognitive Radio for Tactical and Public Safety Communications, Jun. 2008.
Tenhula et al., "Policy-Based Spectrum Access Control for Public Safety Cognitive Radio Systems," Shared Spectrum Company, 2008.
Erpek, Location-based Propagation Modeling for Opportunistic Spectrum Access in Wireless Networks, Dec. 7, 2007.
Perich, Policy-Based Network Management for NeXt Generation Spectrum Access Control, 2nd IEEE International Symposium on New Frontiers in Dynamic Spectrum Access Networks (DySPAN 2007), Apr. 2007, pp. 496-506.
Seelig, A Description of the Aug. 2006 XG Demonstrations at Fort A.P. Hill, 2nd IEEE International Symposium on New Frontiers in Dynamic Spectrum Access Networks (DySPAN 2007). Apr. 2007, pp. 1-12.
Shared Spectlum Company, Products, 2007.
SSC, Shared Spectrum Company to Demonstrate XG Radio Technology at IEEE DySPAN Conference, Apr. 9, 2007.
Shared Spectrum Company, "Thales Communications and Shared Spectrum Company Team to Add Dynamic Spectrum Access Technology to Military Radios," Dec. 2007, pp. 1-2.
Steadman et al, Dynamic Spectrum Sharing Detectors, 2nd IEEE International Symposium on New Frontiers in Dynamic Spectrum Access Networks (DySPAN 2007), Apr. 2007, pp. 276-282.
Zeng et al, Maximum-Minimum Eigenvalue Detection for Cognitive Radio, IEEE 18th International Symposium on Personal, Indoor and Mobile Radio Communications (PIMRC'07), Sep. 3, 2007, pp. 1-5.

McHenry, "Adaptive Spectrum Technology: Findings From the DARPA XG Project," Shared Spectrum Company, Software Radio Summit, Feb. 23, 2007.
McHenry et al, XG dynamic spectrum access field test results [Topics in Radio Communications], IEEE Communications Magazine, Jun. 2007, pp. 51-57, v: 45, n: 6.
McHenry et al, Creation of a Spectrum Sharing Innovation Test-Bed and the President?s Spectrum Policy Initiative Spectrum Sharing Innovation Test-Bed, Jul. 2006.
SSC, Shared Spectrum Company Successfully Demonstrates neXt Generation (XG) Wireless Communications System, Sep. 18, 2006.
Tenhula, Shared Spectrum Company Successfully Demonstrates Next Generation (XG) Wireless System, Sep. 20, 2006.
Anticipated XG VIP Demo Invitees, Jun. 28, 2006.
Tenhula, Dynamic Spectrum Sharing Bid, Lease and MVNO/MVNE: Spectrum Options for Operators, WCA 2006. Jun. 29, 2006.
Tenhula,"Secondary Markets and Spectrum Leasing", UTC Telecom 2006, Tampa, FL, May 23, 2006.
Zheng et al, Device-centric spectrum management, 2005 First IEEE International Symposium on New Frontiers in Dynamic Spectrum Access Networks (DySPAN 2005), Nov. 8, 2005, pp. 56-65.
Ackland et al., "High Performance Cognitive Radio Platform with Integrated Physical and Network Layer Capabilities," Network Centric Cognitive Radio, Jul. 2005, pp. 1-13.
Leu et al, Ultra sensitive TV detector measurements, 2005 First IEEE International Sympusium on New Frontiers in Dynamic Spectrum Access Networks (DySPAN 2005), Nov. 2005, pp. 30-36.
McHenry, The probe spectrum access method, 2005 First IEEE International Symposium on New Frontiers in Dynamic Spectrum Access Nelworks (DySPAN 2005), Nov. 8, 2005, pp. 346-351.
Ramanathan and Partridge, Next Generation (XG) Architecture and Protocol Development (XAP), Final Technical Report, Aug. 2005.
Steenstrup, "Channel Selection among Frequency-Agile Nodes in Multihop Wireless Networks." Clemson University and Stow Research LLC, 2005, pp. 1-5.
Zhao et al, Distributed coordination in dynamic spectrum allocation networks, 2005 First IEEE International Symposium on New Frontiers in Dynamic Spectrum Access Networks (DySPAN 2005), Nov. 8, 2005, pp. 259-268.
McHenry, "Dynamic Spectrum Sharing," Presentation to IEEE Communcations Society, 2005.
The International Search Report and Written Opinion, dated Oct. 6, 2008, issued in corresponding International Application No. PCT/US07/22356, filed Oct. 19, 2007.
Ramanathan et al, Next Generation (XG) Architecture and Protocol Development (XAP), Final Technical Report, Aug. 2005.
Dynamic Spectrum Sharing, Presentation, Jan. 25, 2005, 75 pages.
International Search Report and Written Opinion, dated Feb. 8, 2002, issued in corresponding International Application No. PCT/US01/14853.
International Search Report and Written Opinion, dated Mar. 19, 2008, issued in corresponding International Application No. PCT/US07/11414.
International Search Report and Written Opinion, dated Sep. 28, 2009, issued in corresponding International Application No. PCT/US08/073194.
International Search Report and Written Opinion, dated Feb. 14, 2008, issued in corresponding International Application No. PCT/US07/21940.
Project: IEEE P802.15 working group for wireless personal area Network (WPANs), Jun. 2007, pp. 1-25.
Supplementary European Search Report in the European Application No. 01 945944 dated Apr. 24, 2009.
Cabric et al.,"Implementation issues in spectrum sensing for cognitive radios", Signals Systems and Computers, 2004. Conference record of the 38th Asilomar Conference on Pacific Grove, CA, USA, Nov. 7-10, 2004, NJ, USA, vol. 1, pp. 772-776, sections I-IV, Nov. 7, 2004.
Ning Han, Sunghwan Shon, Jae Hak Chung, Jae Moung Kim, "Spectral correlation based signal detection method for spectrum sensing in IEEE 802.22 WRAN systems", Advanced Communication Technology, 2006. ICACT 2006. The 8th International Con-

(56) References Cited

OTHER PUBLICATIONS ference, Piscataway, NJ, USA, vol. 3, ISBN 89-5519-129-4, (Feb. 20, 2006), pp. 1765-1770, URL: http://ieeexplore.ieee.org/xpls/abs_all.jsp?arnumber=1625936, (May 15, 2009), XP002528460.

Falconer et al, Frequency Domain Equalization for Single-Carrier Broadband Wireless Systems, IEEE communications Magazine, Apr. 2002, pp. 58-66, v: 40, n: 4.

Rohde et al.,"RF/Microwave Circuit Design for Wireless Applications", published by Wiley-Interscience, Mar. 2000, pp. 1-2.

WIPO,"International Search Report", for Application No. PCT/US04/17883 filed Jun. 9, 2004, dated Mar. 25, 2005.

European Patent Office, European Examination Report in Application No. PCT/US2007022356, dated Oct. 30, 2011.

PCT Office Communication in the PCT application No. PCT/US2008/073193 dated Jun. 2, 2009.

Han et al, Spectral correlation based signal detection method for spectrum sensing in IEEE 802.22 WRAN systems, The 8th International Conference of Advanced Communication Technology, 2006 (ICACT 2006), Feb. 20, 2006, pp. 1765-1770, v: 3.

The International Search Report and Written Opinion, dated Mar. 19, 2008, issued in corresponding International Application No. PCT/US07/11414.

Office Action dated Mar. 27, 2017 as received in EP Application No. 08855797.0.

Bemthal, J.B.; Brown, T.X.; Hatfield, D.N.; Sicker, D.C.; Tenhula, P.A.; Weiser, P.J., "Trends and Precedents Favoring a Regulatory Embrace of Smart Radio Technologies," New Frontiers in Dynamic Spectrum Access Networks, 2007. DySPAN 2007. 2nd IEEE International Symposium on, vol., No., pp. 633,648, Apr. 17-20, 2007.

Marcus, Michael J., "Spectrum Policy for Radio Spectrum Access," Proceedings of the IEEE, vol. 100, No. Special Centennial Issue, pp. 1685-1691, May 13, 2012.

Cha-sik Leem; Jaiyong Lee; Hyunduk Kang; Chang-Joo Kim; Moonwon Lee; Sung-chul Kang, "Making the Best out of Spectral Efficiency; Studies on the Introduction of Open-Spectrum Policy," Cognitive Radio Oriented Wireless Networks and Communications, 2008. CrownCom 2008. 3rd International Conference on, vol., No., pp. 1,4, May 15-17, 2008.

DeBoer, D.R.; Cruz-Pol, S.L.; Davis, M.M.; Gaier, T.; Feldman, P.; Judge, J.; Kellermann, K.I..; Long, D.G.; Magnani, L.; McKague, D.S.; Pearson, T.J.; Rogers, A.E.E.; Reising, S.C.; Taylor, G.; Thompson, A.R.; van Zee, L., "Radio Frequencies: Policy and Management," Geoscience and Remote Sensing, IEEE Transactions on, vol. 51, No. 10, pp. 4918-4927.

* cited by examiner

METHOD AND DEVICE FOR POLICY-BASED CONTROL OF RADIO

This application is a continuation of U.S. application Ser. No. 11/783,563, filed Apr. 10, 2007, which claims priority to U.S. Provisional Application No. 60/877,656, filed on Dec. 29, 2006.

This invention was made with Government support under Contract FA8750-05-C-0150 awarded by the Air Force. The Government has certain rights in this invention.

FIELD OF THE INVENTION

The present invention relates to controlling a radio using a policy. More particularly, the present invention relates to policy-based control of a software-defined radio having policy components.

BACKGROUND OF THE RELATED ART

Networking devices that run according to a policy, or constraints, must conform to the policy or they will not be allowed to transmit within the network. The policy usually controls the devices in order to prevent any collisions with other radio devices or networks. The other networks are known as "non-cooperative" (NC) and could interfere with the radio device. Further, the radio device seeks not to transmit to cause interference, but seeks to avoid it.

Policies, such as those promulgated by the government, are in a language spoken or read by people, such as English or Spanish. Manufacturers or other entities assemble the radio at a location and ship it to a user.

A conventional radio may employ a prevention mode to eliminate security threats implied by policies. Regulators, such as government officials, define fixed requirements for building an application-specific radio device. Manufacturers design products based on their interpretation of the requirements, i.e. policies, and prove to regulators that the built radio satisfies the requirements in order for the radio device to be classified as "certified."

After all this, a user or operator can purchase a radio device. Although the radio device may be configurable, the configuration options are limited as majority of the features are "locked" prior to the certification process.

Should the user decide to change the application of her radio devices or travel to a location having different policies, the user must take it back to the manufacturer to have the radio modified and re-certified. Otherwise, anyone could modify the software on the radio and security breaches and tampering would result if the radio fell into the wrong hands.

Smart software-defined radio devices (SDRs) offer tremendous performance and operational benefits over current radios. The benefits include the ability to employ dynamic spectrum access procedures, to tailor the system design to a user's unique circumstances and to remotely configure and control networks.

Additionally, a unique aspect of SDRs is their radically different approach from currently established principles of spectrum access. These principles impact many stakeholders. A stakeholder may be any entity, person, company, government agency and the like that have an interest in spectrum availability for a particular band or frequency. For example, users and operators may pool spectra together to improve spectrum access, lease spectrum or use spectrum available to a second market. Actors, such as owners, users and regulators, desire an assurance that the SDRs will not interfere with current spectrum users. Although the actors might be considered the same for any wireless network, a difference with SDRs is that each actor can influence the design, implementation, deployment and performance of a radio.

One drawback to SDRs involves the complexity of their adaptive software. Adaptive software can change its operation mode throughout the life of the device. Verification of all the states of a SDR may be difficult or unfeasible. Further, a SDR may operate in numerous bands during its lifetime. For each band, the software in the SDR may need to emulate different processes, and the processes may need to change and reconfigure dynamically.

These advantages and problems apply to any software-defined device that uses policy-based control. As software becomes more integrated into everyday devices, the control of the device will be driven by the policies and constraints implemented by the software. Instead of hardware changes, modifications and updates may be realized by downloading new policy updates to the device. For example, a software program on a processor may control a coffee maker. A policy constraining the coffee maker could be not heating the water above a certain temperature, such as 100 degrees Celsius, for safety reasons. Thus, the coffee maker will not allow its temperature to rise above that limit. If the limit changes, however, the coffee maker will have to be taken back to the manufacturer or replaced. If the user chooses to not update the limit, then warranties or indemnities may cease to apply for the coffee maker's usage.

SUMMARY OF THE INVENTION

The embodiments of the present invention disclose a software-defined device that provides advantages and solutions over conventional devices. The disclosed embodiments implement a policy-based approach that enables the control of devices built by different manufacturers using software controllers. An example of an applicable device is a SDR. Because radio devices operate in bands and locations under various jurisdictions, points of control, different stakeholders, and the like, and because their requirements change dynamically, the disclosed embodiments allow the modification of the radio devices' operation at run-time to follow a variety of policies and requirements.

The disclosed embodiments of the present invention define the foundation for defining policies. The foundation specifies in a computer-understandable language what the device can do and what the device must not do using a semantic policy language, types, rules and instances. Another area defines policy control components on a device enforcing the policies by restricting the device's operational state. Another area defines a framework for securely creating, managing and controlling device policies.

The disclosed embodiments allow for easy configuration of a device having software and other improvements over the current art. By changing policies and their content, a device can adapt any configuration, setting or operational strategy used. The disclosed embodiments may provide improved policy authoring by using a semantic language to create a generic policy abstracting the low-level requirements of specific devices, thus allowing a common policy applicable to multiple devices from multiple manufacturers.

The disclosed embodiments also provide for secure policy enforcement. The policies are enforced on the device by a software component referred to as a controller. Policies exert direct control over the device and impose limits, such as limits on transmitter power and frequencies in the case of a radio device as well as the type of operations the radio device must execute. Policy components also automatically identify stale policies and either request an update or stop the device from operating, e.g. transmitting, under certain conditions, until the policies are updated.

Policy enforcement according to the disclosed embodiments also automatically combines all policies and permits execution of functions if requirements imposed by all applicable policies are met. Policy components also automatically determine sufficient states that satisfy policy enforcement requirements and make the requirements available to the device as additional spectrum opportunities. The controller component of the software may find pre-conditions that must be met for the device to perform a certain action. Thus, in addition to device control, the controller provides an optimization feature to the device.

Thus, a device according to the disclosed embodiments includes policy-based components that are tightly integrated with the controller components on the device. Policy conformance and enforcement components ensure that a device does not violate policies provided by a stakeholder, agency, user or other entity. The policies are encoded in an abstract, semantic language that defines regulatory and other stakeholders' goals and requirements. The device also secures the policy management and distribution mechanisms to prevent malicious users from altering loaded policies or inserting additional policies that lead to harmful results or interference.

The disclosed embodiments address concerns raised by any stakeholder. The disclosed embodiments allow regulators and other points of control to continue controlling a policy-based device, such as where and how they operate. Users, however, of the devices are able to take advantage of the software-defined technology and its dynamic capabilities.

BRIEF DESCRIPTION OF THE DRAWINGS

The accompanying drawings, that are included to provide further understanding of the disclosed embodiments, illustrate embodiments of the invention and, together with the description disclosed below, serve to explain the principles of the invention.

DETAILED DESCRIPTION OF THE PREFERRED EMBODIMENTS

Figure 1:
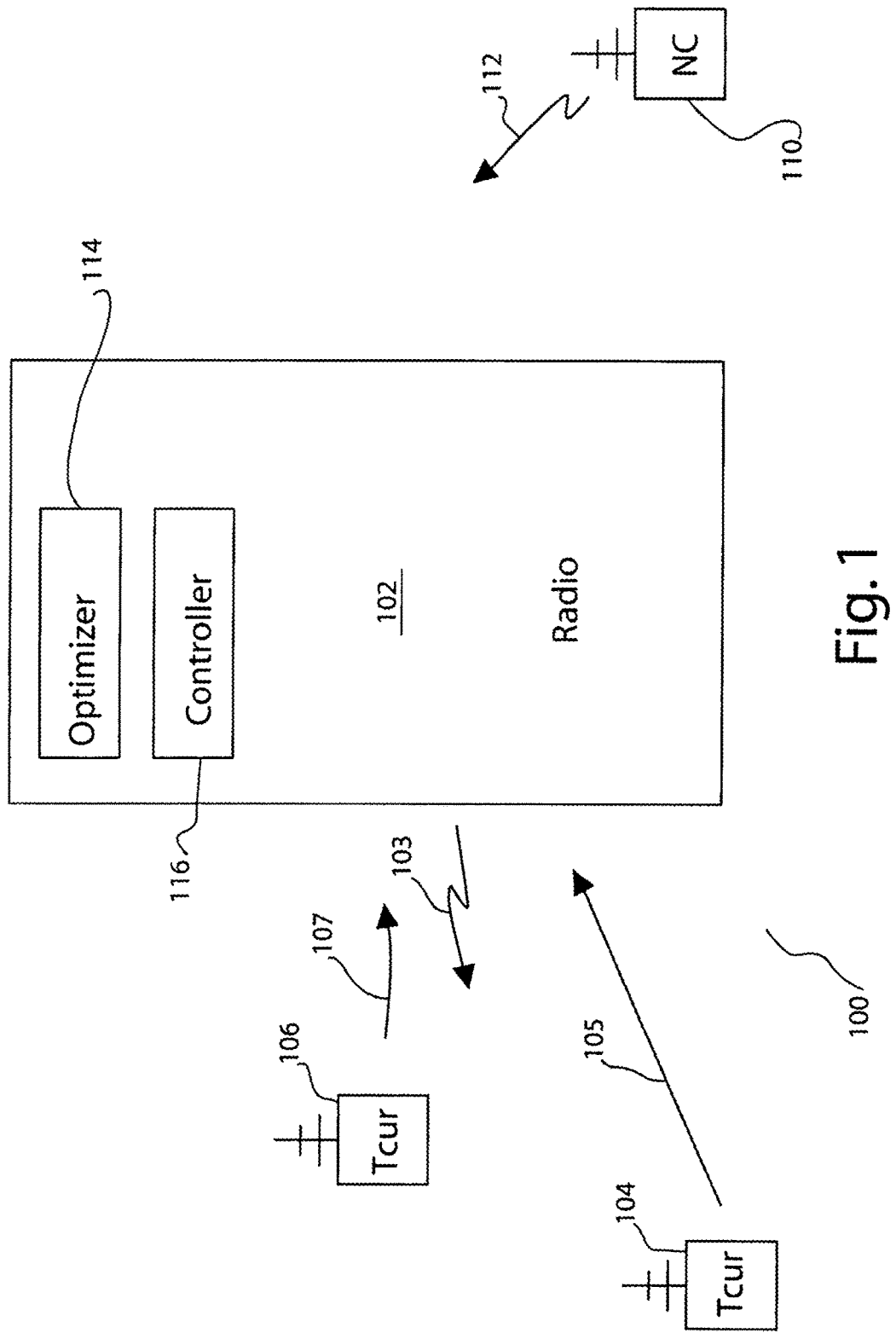
FIG. 1 illustrates a device in a network environment according to the disclosed embodiments.

Aspects of the invention are disclosed in the accompanying description. Alternate embodiments of the present invention and their equivalents are devised without parting from the spirit or scope of the present invention. It should be noted that like elements disclosed below are indicated by like reference numbers in the drawings.

FIG. 1 depicts a device 102 in a network environment 100 according to the disclosed embodiments. Preferably, device 102 is a software-defined radio (SDR) device having various software components that serve to control radio device 102. Device 102 transmits and receives signals to other devices in environment 100. Device 102 executes steps and instructions associated with the software components to perform the functions and operations to participate within network environment 100.

Device 102 may be any device that includes software components that control functions and operations. The software components include instructions understandable by device 102 to execute the functions and operations. Device 102 preferably is a SDR that transmits and receives signals within network environment 100. The following description discloses embodiments pertaining to a radio for device 102, and using software for determining spectrum access rights within network environment 100. Device 102, however, is not limited to radio devices or devices used for transmitting signals. Using the above coffee maker example, device 102 may be a coffee maker using software components for policy-based control.

Referring back to FIG. 1, network environment 100 also includes devices 104 and 106. Device 102 transmits and receives signals from devices 104 and 106. For example, device 104 transmits signal 105 at a certain frequency to device 102. The frequency may be within an available frequency spectrum selected and used by network environment 100. Device 106 transmits signal 107 within network environment 100.

Device 102 may receive signals 105 and 107, or transmit signal 103 at the same frequency. A policy embedded within device 102 allows the reception and transmission of the signals. If device 104, for example, switches to another available frequency spectrum, then device 102 may not receive signal 105 if doing so violates the policy. Further, device 102 will not transmit signal 103 if the policy is violated due to the switching of the frequency spectrum available to network environment 100.

Non-cooperative (NC) radio device 110 transmits signal 112 that may interfere with device 102 as it operates within network environment 100. NC radio device 110 is not part of network environment 100. NC radio device 110 should transmit signal 112 on a frequency not within the frequency spectrum available to device 102. If, however, signal 112 does transmit within the spectrum, device 102 may have to select another available frequency spectrum or shut down. NC radio device 110 or other non-cooperative devices may interfere with other operations of device 102 instead of available frequency spectrum.

Referring back to the coffee maker example, device 102 may serve as a coffee maker subject to policies to prevent injury or damage. A policy for device 102 states that heat is not applied when no water is present in a chamber of the coffee maker. A user indicates that coffee should be made. Device 102 sends a command to apply heat to the chamber to boil water. A sensor in the chamber indicates that no water is present. Subsequently, device 102 cancels the heat application command and prevents damage to the coffee maker or an injury to a user.

Thus, a policy associated with device 102 prevents further transmission of signal 103 upon detection of signal 112 from NC radio device 110. If devices 104 and 106 of network environment 100 move operations to another frequency spectrum, then device 102 may resume communications provided that the policy is not violated.

The software components within device 102 help define and apply the policies. The policies, however, change over time or in different locations or conditions for network environment 100. For example, the policy excluding communications with NC radio 110 or the reception of signal 112 may change to be inclusive of NC radio 110. Thus, device 102 must modify its policy to allow reception of signal 112 and the transmission of signal 103 in the presence of NC radio 110. According to the disclosed embodiments, device 102 updates its policies while still operating within network environment 100 without the need for hardware switches or down time to visit a facility.

As part of this process, device 102 interacts with system operation optimizer 114 and system conformance controller 116. Device 102 acts as a cognitive device that makes its own decisions on how to operate within network environment 100. According to the disclosed embodiments, device 102 can find new opportunities or respond to problems faster than non-adaptive devices. Further, device 102 acts a device that can change applications and functions from its present state to other states. In other words, device 102 may modify its functions to perform as another device. The disclosed embodiments are not limited to radio devices, but are applicable to any device that is software-defined and uses policy-based control, such as a router or even a coffee maker. The controls are updated periodically in the device.

As a software-defined device, device 102 dynamically changes its operating parameters and strategies. Stakeholders and regulators still define fixed requirements, but the requirements are for a generic device. A manufacturer designs, produces and proves to the stakeholders and regulators that the device satisfies the requirements to certify the device for use. The device contains software components or modules that allow for the device to be reconfigured dynamically at later times. For example, device 102 may be considered "certified and open" because it can operate in different bands emulating different applications depending on current policies.

Concurrently, stakeholders and regulator also define regulatory policies that are applicable to specific application and are certified for use. Thus, a user acquires an open, certified device from a manufacturer and specifies the type of application for the device by providing the software with appropriate policies. The policies define what the device can do and what the device must not do. Referring back to FIG. 1, the policies let device 102, for example, know that it can receive and process signals 104 and 106, but must not process signal 112.

Optimizer 114 executes heuristics to optimize device 102 or network environment 100. Optimizer 114 may continuously modify or reconfigure device 102 and its components as needed. Policies and functions are deleted and added as needed. Controller 116 provides a guarantee that device 102 does not violate scope of any policy or regulation imposed on network environment 100, device 102 and the like. Controller 116 assures the user, network operator and other outside or interested parties that optimizer 114 will be held to the policies and regulations. Controller 116 monitors and restricts what optimizer 114 does in executing functions on device 102.

Official policies and regulations for device 102 or network environment 100 are encoded in an abstract computer language, and then loaded to controller 116. Using the encoded policies, controller 116 monitors device 102 and notifies a monitor or network operator if a policy or regulation is violated. The network operator may be a government agency, a stakeholder, a facilitator, and the like. Controller 116 also tells optimizer 114 what states that device 102 is allowed to be in and what needs to happen to arrive at those states.

Controller 116 also guards optimizer 114 to ensure that device 102 does not enter an invalid state per the applicable policies. Thus, controller 116 blocks invalid commands issued by a component within device 102. Moreover, controller 116 can inform optimizer 114 to help in the decision making process for device 102.

From a policy component perspective, optimizer 114 acts as an external module within device 102 that controls hardware components, gathers data, forms strategies to implement functions and provides an interface for transmitting and receiving data and signals. Controller 116 acts as a policy manager for managing local policies and responding to remote commands and a policy conformance reasoner for reasoning over policies and device-provided evidence. Controller 116 interacts with optimizer 114 to determine what opportunities are available to device 102. For example, using device 102 as a radio, controller 116 and optimizer 114 determine spectrum access opportunities. Using this information, optimizer 114 determines and executes applicable system strategies that are needed for signal 103 to conform to the policies.

Optimizer 114 is responsible for providing controller 116 with access to its current state as well as evidential results obtained from other components on device 102, including detectors and data received from other devices, such as devices 104 and 106.

Figure 2:
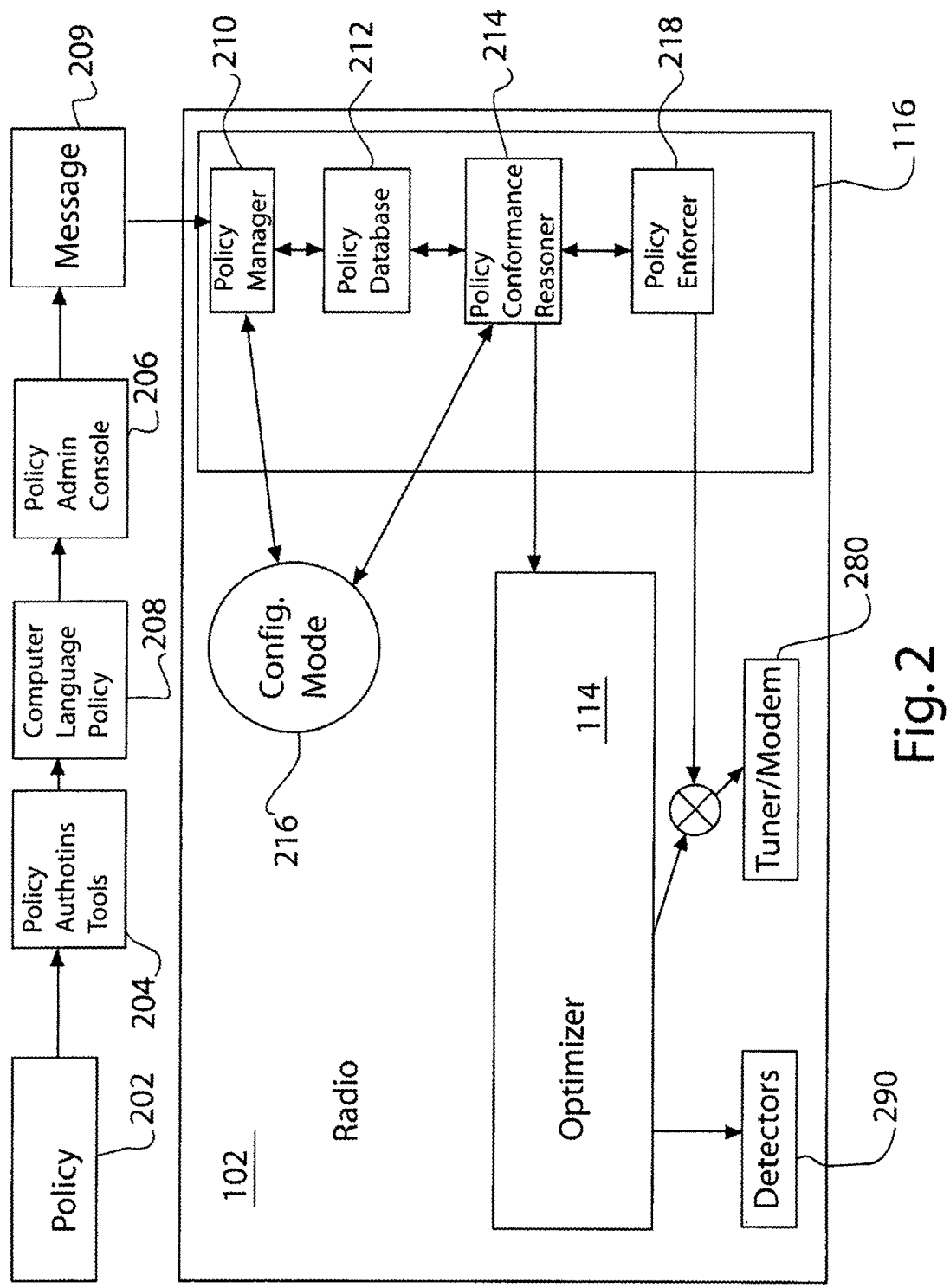
FIG. 2 illustrates a software-defined device according to the disclosed embodiments.

FIG. 2 depicts the policy components of device 102 according to the disclosed embodiments. The "policy components" are a part of the software components that execute on device 102 and use policy-based control. Other software components also reside on device 102 that execute functions. Upon executing these functions, device 102 operates.

Device 102 receives computer language encoded policy 208 that controls what function can and cannot be executed. Computer language policy 208 corresponds to policy 202 that is written by a stakeholder, regulatory agency, government officials, and the like. Alternatively, policy 202 is user defined, such as a temperature limit for a coffee maker. Policy 202 is written to include rules and directives for device 102. Policy 202 should be written in "plain language," such as English, Spanish, French, Chinese, Japanese and the like.

Policy authoring tool 204 allows authenticated and authorized stakeholders to create and modify documents pertaining to policy 202. Further, policy authoring tool 204 includes policy analysis and validation tools that analyze the impact of constraints of policy 202 and validate their correctness. Policy authoring tool 204 generates computer language policy 208 by translating policy 202 into a policy language, as disclosed below. Policy authoring tool 204 also helps verify that computer language policy 208 correctly represents the intended meaning of policy 202, which may be open to interpretation.

Computer language policy 208 represents a semantic language for expressing policies and logic used for guiding operation of software-defined devices. The main purpose of using computer language policy 208 is to allow regulators, operators and users to define requirements for controlling operations using a policy-driven evidential approach that are interpretable by machines. Computer language policy 208 defines the concepts for expressing knowledge about device 102. Computer language policy 208 also defines concepts for expressing restrictions on device 102, and defines concepts for combining the restrictions and definitions into rules and restrictions.

Computer language policy 208 provides an interoperable, machine independent language for expressing information that is processed by humans and by machines. Computer language policy 208 comprises ontologies, which defines vocabulary for representing meaning of a subset of domaindependent terms and the relationships between those terms. Using these ontologies, computer language policy 208 annotates information that is shared and used to infer additional information across heterogeneous domains, applications and platforms.

Additionally, computer language policy 208 also employs concepts from Deontic logic for expressing actions that device 102 can undertake. Computer language policy 208 may implement on two concepts, permissions and prohibitions. Permission defines what device 102 is allowed to do and the constraints that device 102 must satisfy. Prohibition, on the other hand, defines a situation when device 102 is forbidden from taking a specific action.

Policy 202 defines a collection of facts and constraints that can be used for deciding whether a policy is applicable to the current state of device 102. Policy 202, for example, may control access to the spectrum for device 102. Policy 202 also defines whether it allows or denies device 102 use of the spectrum when its conditions are met. Preferably, policy 202 includes three sections. The first section may refer to a meta-definition for allowing a policy component to determine when policy 202 is applicable and how it impacts device 102. The second section may refer to a set of information that policy 202 depends on. The third section may refer to rules and directives for determining when device 102 either meets or violates the requirements of policy 202.

Device 102 may operate over multiple concurrently applicable policies. For example, device 102 may have policies from two regulators, each regulating one spectrum band that device 102 operates in. Moreover, some policies may overlap for same frequency band where device 102 is attempting to transmit. Computer language policy 208, therefore, defines vocabulary for creating meta-level policies. Meta-level policies are used for guiding the operation of access control policies, such as guiding permissive and prohibitive policies. The meta-level vocabulary defines constructs for de-conflicting overlapping policies.

The computer policy language 208 may depend on any de-confliction logic. For example, a default de-confliction rule of computer language policy 208 states that a prohibitive policy overrides a permissive policy. The meta-level vocabulary, however, allows absolute and relative prioritization of policies to be defined, thus overriding the default rule. Computer language policy 208 defines vocabulary for assigning numeric priority levels to policies. Computer language policy 208 also defines vocabulary for relative ordering policies by defining relationships between pairs of policies.

In addition to policies, computer language policy 208 also defines vocabulary for expressing knowledge about states and capabilities of device 102. Using this vocabulary, computer language policy 208 defines, expresses and enters additional information about different devices and their capabilities. The vocabulary include terms for expressing states for each functional aspect of device 102, such as an operational configuration of a transmitter in terms of power and frequency as well as history of collected detections from detectors 290, or time, location, frequency, power, signals and the like.

Computer language policy 208 also defines vocabulary for expressing conditions on the states of radio device and for representing computer-understandable rules. Computer language policy 208 allows one to define policy 202 for controlling spectrum access by specifying the desired states of device 102, collected supporting evidence for decision making and by restricting undesired situations.

Policy administration console 206 allows an operator within network environment 100, for example, to communicate with device 102 and other devices. Each operator may be assigned at least one form of a security object for authenticating its messages. When an operator within network environment 100 desires to send a message 209 to device 102, policy administration console 206 creates a specific command according to a predefined format. Policy administration console 206 sends message 209 to device 102 over a secure link where message 209 is recognized as either a policy command or query, and sent to policy manager 210 for processing.

Each command or reply element of message 209 defines specific commands or responses supported by policy manager 210 located on device 102. An element may include a unique message identifier, timestamp, sender identity and intended recipient identity. For commands, the element also may include a method or process specifying the type and the content of a command. For feedback response from device 102, the element includes a unique message reply identifier, an error or an "ok" element, and an optional data element populated with requested content.

Policy manager 210 acts as a gateway to controller 116 located on radio 102. Policy manager 210 checks message 209 for security by validating authentication and authorization of command issuers and sources. The identity of the issuer, the sender and the destination is included in message 209.

Policy manager 210 verifies the integrity of a command, the authenticity of the sender, the authorization of the sender to issue such a command, authenticity of the receiver and the timeliness of a command for avoiding reply attacks. If policy manager 210 is able to verify that message 209 should be processed, then policy manager 210 checks the type of message in order to either adjust the policy component state or to answer specific policy-related questions.

Policy manager 210 accesses a persistent storage as policy database 212 to receive policies and to load active policies into policy conformance reasoner (PCR) 214. Policy manager 210 also supports multiple policy configuration modes. Each configuration mode represents a set of policies that are applied when the configuration mode is "activated." Preferably, one mode is activated at a time and the active mode is indicated as "running." Configuration mode 216 represents the running policy configuration mode in FIG. 2. All policies that are part of running policy configuration mode 216 are automatically loaded and activated in PCR 214.

Thus, policy manager 210 allows operators to add and remove policies, such as policy 202, from any configuration mode. When a configuration mode is not specified, the current running mode is assumed by default. Policy manager 210 also allows operators to switch between modes. When the mode changes, all policies belonging to the previous mode are unloaded and all policies from the new mode are loaded and activated. By switching a mode, policy administrators, stakeholders, and the like can quickly switch between a set of policies for device 102.

Policy manager 210 also allows operators to query the state of each configuration mode. Unless declared otherwise, the current running mode, such as configuration mode 216, is assumed by default. Configuration mode 216 is associated with a set of decisions, complaints, conflicts, and the overall status of policy manager 210 to allow operators to monitor the integrity of their systems, or device 102.

Message 209 may include a command that impacts running configuration mode 216. Either policy 202 may have been added or removed from the mode or another mode may have been activated. Thus, policy manager 210 is responsible for activating the right set of policies inside PCR 214 for controller 116.

PCR 214 acts as a local policy decision unit. PCR 214 parses and validates a policy available to device 102, and checks that the policy conforms to any policy language definitions. PCR 214 also verifies that validity of the policy by examining its meta-description. Once validated, PCR 214 converts the policy into its internal representation. PCR 214 extracts the data defined inside the policy document as well as extracts and optimizes the constraint rules defined by the policies.

PCR 214 orders all active policies based on decreasing importance. This action is desired for reducing the workload for policy conformance reasoner 214 to reach a decision on approving or denying a specific transmission request from device 102 as well as for computing available spectrum access opportunities.

Thus, PCR 214 dynamically merges and de-conflicts policies as they are made available to radio 102. De-confliction actions apply a default rule for breaking ties between permissive and prohibitive policies, numerical priority levels assigned to policies, and relative policy ordering. In the event of one permissive policy and another permissive policy being more important than each other, such as creating a cycle, the default rule guarantees that a prohibitive policy takes precedence over a permissive policy, and avoids potentially harmful interference by denying instead of allowing a request. PCR 214 also computes decisions allowing or denying transmissions based on requests originated from policy enforcer 218.

Policy enforcer 218 periodically evaluates the current state of device 102 and the logical channels employed by optimizer 114. For each channel, policy enforcer 218 maintains a set of pre-approved device states that optimizer 114 matches in order to be permitted to transmit. Alternatively, for each channel, policy enforcer 218 inquires if the current state for that channel would be approved using PCR 214. Policy enforcer 218 maintains the decision caches to limit the amount of work needed from the computation-intensive PCR 214. Policy enforcer 218 pro-actively monitors channels optimizer 114 is attempting to use as well as enforcing that transmissions originating at optimizer 114 fully satisfy policy requirements.

The primary function of policy enforcer 218 is to stop actions whose effects would violate policies. For example, policy enforcer avoids harmful interference by interrupting transmission commands sent to modem 280 on device 102. To enable this function, policy enforcer 218 maintains a set of pre-approved state models based on configuration policies and associated validity time periods. During an adjustable time period, policy enforcer 218 assumes that the pre-approved device state would be approved. The time period can range from zero (0) to several hours.

Figure 3:
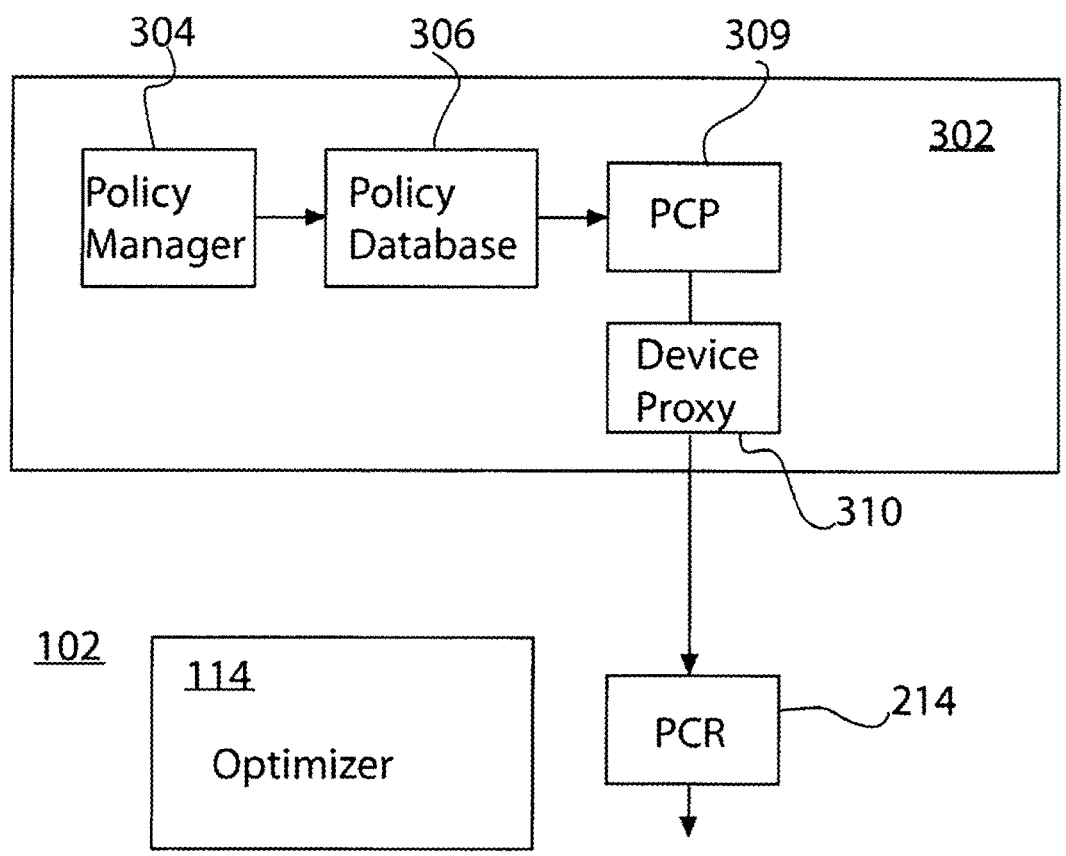
FIG. 3 illustrates another software-defined device according to the disclosed embodiments.

FIG. 3 depicts another configuration for device 102 according to the disclosed embodiments. Device 102 of FIG. 3 functions as disclosed above except that a remote controller 302 is used. Some of the components disclosed above within controller 116 are now found in remote controller 302. With regard to deciding whether a command or action on radio device violates a policy, device 102 of FIG. 3 functions as disclosed above.

Components housed in remote controller 302 include policy manager 304, which corresponds to policy manager 210 of FIG. 2. Policy database 306 corresponds to policy database 212 of FIG. 2. Remote controller 302 also includes policy conformance reasoner (PCR) 308 and device proxy 310. In other words, controller 116 includes components in separate locations.

Device 102 still includes PCR 214, as disclosed above. PCR 214 interacts with PCR 308 to ensure that they contain identical information. Remote controller 302 uses device proxy 310 to synchronize reasoner 308 with reasoner 214. Preferably, PCR 214 is updated with the contents of policy conformance reasoner 308 when updates or additions are made to existing policies via policy manager 304.

After a new or modified policy is received in a computer-readable form, policy manager 304 verifies the message containing the instruction and adjusts the policy component state or answers an inquiry. Policy manager 304 provides a persistent storage for policies, but at remote controller 302 instead of device 102.

Another task of policy manager 304 is loading active policies into policy conformance reasoner 308. As disclosed above with regards to FIG. 2, policy manager 210 supports multiple policy configuration modes, where each configuration mode represents a set of policies that are applicable when the mode is activated. In remote controller 302, policy manager 314 takes over this role by supporting multiple policy configuration modes stored in policy database 306. Policy manager 304 loads the active mode into policy conformance reasoner 308.

The active policy held by policy conformance reasoner 308 is loaded into PCR 214. Device proxy 310 copies or synchronizes the data in PCR 308 to PCR 214. Preferably, device proxy 310 copies the contents of policy PCR 308 into multiple PCRs 214 on a plurality of devices. Thus, a large number of downloads and resources can be sent to software-defined radio using only remote controller 302.

Figure 4:
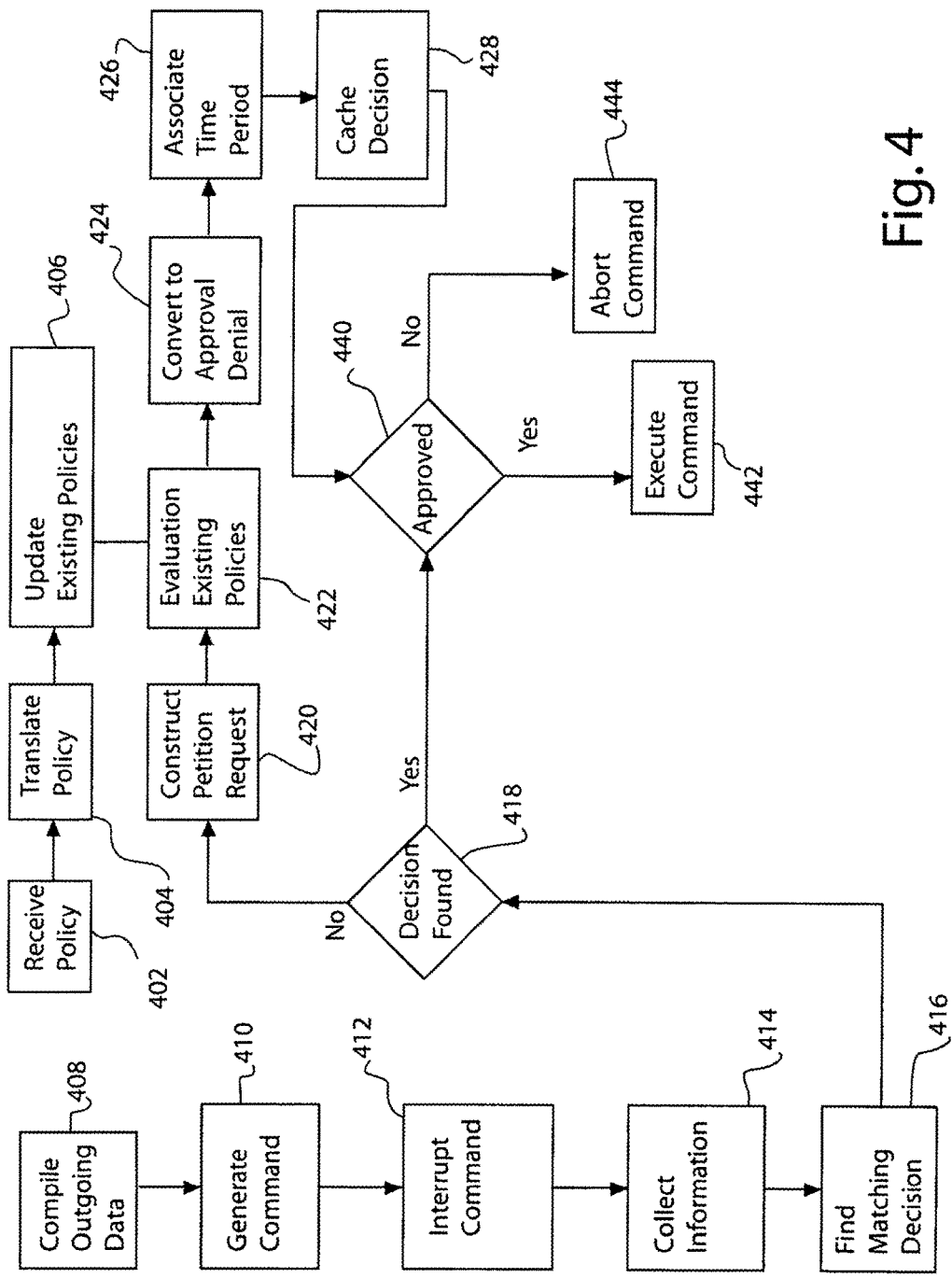
FIG. 4 illustrates a flowchart for policy-based control of a device according to the disclosed embodiments.

FIG. 4 depicts a flowchart for policy-based controlling device 102. For example, the device may be a radio, as disclosed above, and the transmission of signals from device 102 is controlled by a policy corresponding to a configuration mode. Different configuration modes stored on device 102 may be activated depending on the applicable policy.

Using the components of radio 102 of FIG. 2, step 402 executes by receiving a policy 202 applicable to device 102. Alternatively, the policy may just be a change or modification to an existing policy already in policy manager 210. Policy 202 in step 402 comprises regular language understandable by a human. Step 404 executes by translating policy 202 into a computer-readable language policy 208. The regular language expressions of policy 202 are translated into a form understandable to device 102. Preferably, a translator using policy authoring tool 204 generates the computer-readable language policy 208. The translator may be a human, or, alternatively, may be automatic.

Step 406 executes by updating existing policies in computer-readable form on the files stored on device 102. Thus, the subject matter of policy 202 modifies an existing policy configuration mode for device 102, adds a new mode or possibly deletes a mode. If device 102 stores a plurality of configuration modes using policy manager 210, then these files are modified by the downloading of computer-readable language policy 208 to device 102.

Step 408 executes by compiling outgoing data into a transmission. Device 102 wants to send a message or signal within network environment 100. Step 410 executes by generating a command to send the transmission. Optimizer 114 attempts to send a transmit command to tuner/modem 280. Optimizer 114 could generate a command to any component on device 102, and is not limited to transmit commands. The command may pertain to any policy-based control of a device.

Step 412 executes by interrupting the command from optimizer 114 by policy enforcer 218. Policy enforcer 218 performs an analysis of the command to determine whether it should be aborted or executed. Step 414 executes by collecting information about the states of device 102. The information may pertain to any aspect of device 102: Step 414 also may collect information about network environment 100 using detectors 290.

Step 414 also compares the current state of device 102, which includes current configuration, capabilities and results, against pre-approved states. Device 102 maintains state information for its components, such as its transmitter, receiver, signal detectors, location detectors, time detectors, owners, certifications and the like. States of a transmitter include frequency, power, bandwidth, throughput quality and the like. States of a receiver includes average power, bandwidth, frequency, signal-to-noise ratio and the like. All of these components and states are evaluated by policy enforcer 218.

Step 416 executes by finding a matching cached decision with policy enforcer 218. A decision to execute the command may have been made previously based on the current state information collected in step 414. If so, then policy enforcer 218 can bypass the evaluation of the states and the corresponding policies to determine whether to abort or execute the command.

Step 418 executes by determining whether the appropriate cached decision was found. If yes, then step 440 is executed using the approving value of the decision. If the cache shows that a previous matching request was approved, then the command is also approved. Otherwise, the command is aborted.

If step 418 is no, then policy enforcer 218 constructs of full petition request and associates the request with the current snapshot of the states of device 102. Thus, step 420 is executed by constructing the petition request. Policy enforcer 218 uses the current snapshot to represent the capabilities, configuration states and evidence for each component present on device 102. Because some data is fairly static, this information may be pre-loaded inside upon start-up or component change. Policy enforcer 218 may choose to not provide static information with each petition request. Policy enforcer 218 sends the petition request to policy conformance reasoner 214.

Step 422 executes by evaluating existing policies in view of the petition request. Policy conformance reasoner 214 evaluates the petition request against the ordered list of policies based on decreasing performance. For each policy stored by policy manager 210, policy conformance reasoner 214 checks the requirement constraints to decide whether the policy is applicable to the petition. If the policy is applicable and if its rules are met, then policy conformance reasoner 214 uses that policy as the decisive one in granting the petition request.

Each rule associated with the policy, such as policy 202, represents a set of logical and computational constraints on any capability, configuration state or evidence collected by device 102. A rule may consider up to several dozen of the state parameters and comparison and computational operations over the state parameters.

Step 424 executes by evaluating the content of rules of the policy found in step 422 in order to generate an approval or denial of the petition request. The policy found by policy conformance reasoner 214 is used to see if the petition should be approved. Because the policy list is ordered by decreasing priority, further analysis of policies is not necessary. Further, no policy with a higher priority can override the decision made by the policy chosen by policy conformance reasoner 214.

If the policy is permissive, then the petition is approved. If the policy is prohibitive and its rule is satisfied, then the petition is denied. In other words, if a policy prohibits a behavior, and the current states of device 102 meets the conditions for the behavior, then policy conformance reasoner 214 will deny the petition. If a policy permits a behavior, and its conditions are met, then the petition is granted to execute the desired function.

Step 426 executes by associating a time period with the petition. The time period is predefined. Step 428 executes by caching the decision by policy enforcer 218. The decision is returned to policy enforcer 218. Policy enforcer 218 caches the decision for the time period of step 426.

Step 440 executes by determining whether to approve the command. This step is performed by looking at the cached decision after the time period has lapsed or reviewing the matching decision found in step 416. Policy enforcer 218 decides whether to let device 102 proceed with the command from optimizer 114. If step 440 is yes, then step 442 executes by executing the command. If step 440 is no, then step 444 executes by aborting the command. Policy enforcer 218 informs device 102 and optimizer 114 of its decision.

For example, device 102 desires to transmit a signal. After preparing, or compiling the data for the signal, device 102 orders optimizer 114 to determine whether the current frequency spectrum is available for signal transmission. Policy enforcer 218 interrupts the command to transmit to determine whether executing the command would violate a regulatory, stakeholder, user or other policy. If a transmission violates a prohibitive policy, then policy conformance reasoner 214 identifies the policy from the list of existing policies. Recent modifications to the policy are reflected by translating the human readable policy into a computer-readable language one.

Information collected by device 102 and detectors 290 provides a snapshot of the current states and conditions used to evaluate whether the policy is violated. Policy conformance reasoner 214 of controller 116 converts the evaluation into an acceptance or denial of the petition. Policy enforcer 218 receives the acceptance or denial, and then acts to execute or abort the command accordingly.

Figure 5:
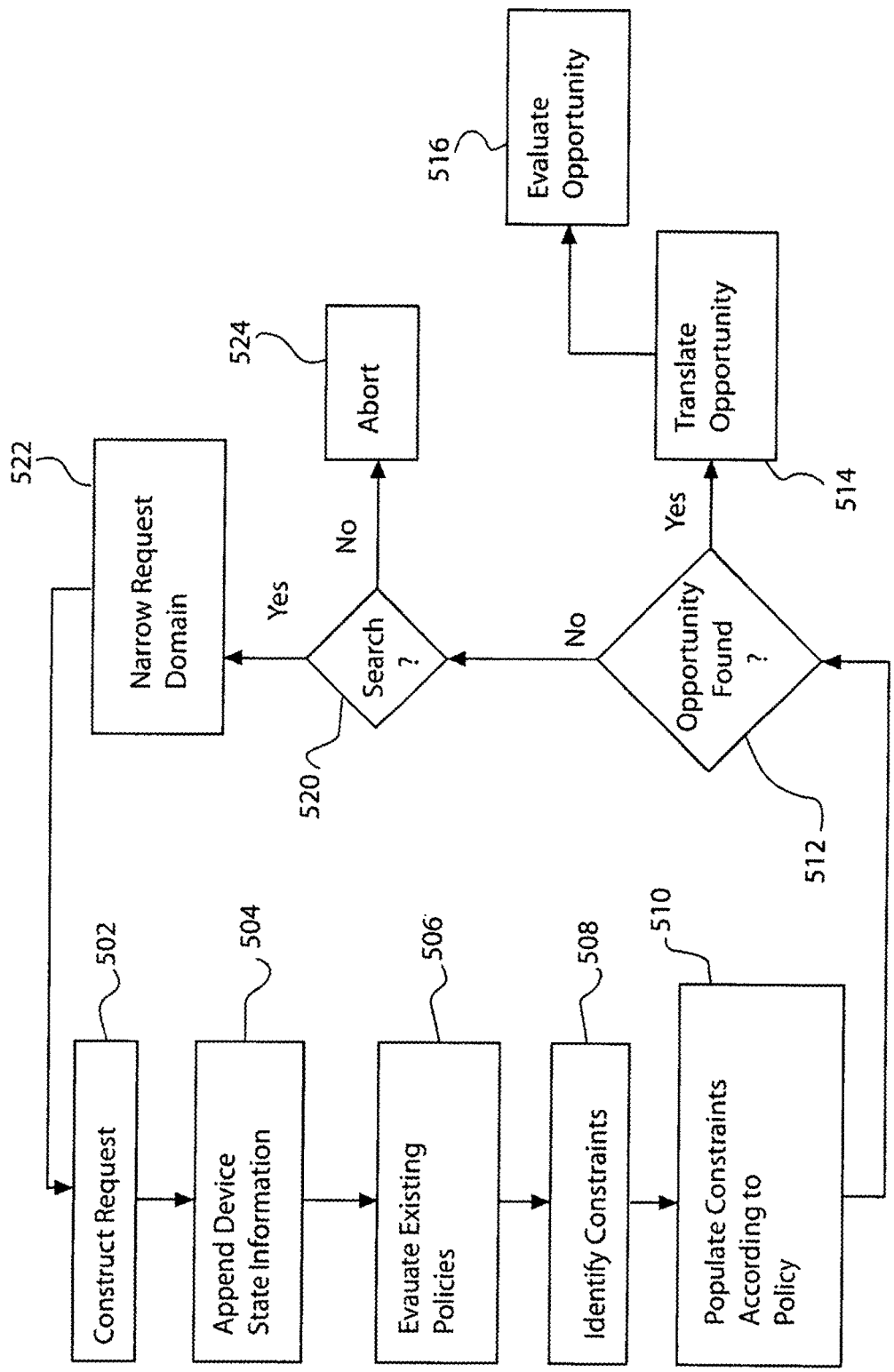
FIG. 5 depicts a flowchart for determining opportunities on a device according to the disclosed embodiments.

In addition to permitting spectrum access, the policies loaded onto device 102 are used to determine spectrum access opportunities. This feature allows optimizer 114 to recognize automatically newly available channels and requirements that optimizer 114 should meet prior to transmitting on the channels. FIG. 5 depicts a flowchart for determining spectrum access opportunities on device 102 according to the disclosed embodiments. Device 102 desires to find spectrum access opportunities that it can exploit for signal transmission. Device 102, however, does not want to pursue spectrum opportunities that will result in policy violations. Such efforts waste time and resources.

Step 502 executes by constructing a request to find spectrum access opportunities. Optimizer 114 prepares an opportunity selection request, which is similar to a transmission petition request disclosed in FIG. 4, except that the opportunity selection request does not fully populate all the constraints of its states. For example, optimizer 114 may choose not to set a transmission frequency, and only provide the possible frequency ranges device 102 can or wants to support. Step 504 executes by appending device state information to the request. Thus, information collected from detectors 290 about network environment 100 is added to the request. Optimizer 114 submits the request to policy conformance reasoner 214.

Step 506 executes by evaluating existing policies. Policy conformance reasoner 214 evaluates the request against locally available policies to discover missing values of unpopulated constraints, also referred to as parameters, which would render a valid request. For example, a policy includes constraints on transmission frequencies, whereas the request does not list one. Step 508 executes by identifying constraints, or parameters, not included in the request. In other words, policy conformance reasoner 214 identifies any missing parameters regarding the states of device 102, if possible, which are necessary for approving the device state for transmission.

For example, policy conformance reasoner 214 may conclude for the submitted configuration of the request to be approved, the transmission center frequency should be either 5180 MHz or 2310 MHz. As noted above, optimizer 114 did not list a transmission frequency in its request. An evaluated policy lists these constraints on transmission frequency, and the restrictive nature of the constraints needs to be accounted for.

Step 510 executes by populating the constraints with parameter values according to the policy. The constraints are used to fill out the request with potential values so as to provide possible values for transmission frequency that will not violate a policy. Policy conformance reasoner 214 adds the possible frequencies as constraints to the request.

Step 512 executes by determining whether an opportunity or opportunities were found. If yes, then step 514 executes by translating the identified opportunity into a state. In this scenario, policy conformance reasoner 214 provides a list of two "opportunities" for workable transmission frequencies. The identified opportunities are translated into two device states. One state represents a configuration of device 102 with a transmission frequency set to 5180 MHz. The other state represents another configuration with a transmission frequency set to 2310 MHz. The converted device states are returned to optimizer 114.

Step 516 executes by evaluating the opportunity for a favorable condition. Device 102 is provided parameters, such as transmission frequencies, to consider when determining available spectrum. By evaluating the two opportunities, optimizer 114 can conclude that it needs to monitor for non-cooperative signals at either frequency to be allowed to transmit at the frequencies, and adjusts its detector configuration on device 102 accordingly.

If step 512 determines no opportunity was found, then step 520 executes by determining whether to keep searching. Situations arise when policy conformance reasoner 214 fails to find or fully populate an opportunity. Further, if the request does not match any policy or if it violates a policy, then no opportunity is found. A constraint, or parameter, however, may not be bound if there is an unbound, or limitless, set of possible values. For example, while a value may be restricted to a certain range within the United States, it would be very expensive to bind a device's position to be within the continental United States depending on the accuracy of the detector.

Therefore, if step 520 is yes, then step 522 executes by narrowing the request domain. The step 522 may narrow the request by providing additional state parameter values or by selectively providing different capabilities at a time. The process returns to step 502 to retry finding an opportunity. If no, then step 524 executes by aborting the opportunity discovery process. In most cases, policy conformance reasoner 214 will find a spectrum opportunity, but situations will arise when it is unable to do so.

Thus, policy-based control of a device is disclosed that ensures that the device does not violate policies. The policies are encoded in a declarative language and define regulatory and other stakeholder requirements. Because regulators and stakeholders are not able to certify every state of a device, the disclosed embodiments move the certification and policy enforcement processes closer to the software-defined components of the device. A policy component represents an official regulatory proxy agent that enforces operations on behalf of the regulators based on their ever-changing and dynamic rules and requirements.

Policy-based control is not limited to stakeholders or regulators, but also may include operators or users themselves. Operators or users could have an interest to prevent the device from violating a policy they set with the device to ensure product safety and operability. As more and more devices for everyday use incorporate software, controller software components can monitor and enforce the policies used to ensure the safety and operability. The disclosed embodiments can facilitate the use of the software components in the devices that are not radios seeking spectrum access.

For example, referring to the coffee maker scenario disclosed above, the disclosed embodiments can ensure the coffee maker device follows policies. A policy might include limits on temperature applied to water in the coffee maker, such as preventing the water from going over a boiling point so as to not burn someone using the device. Thus, any command given to raise the temperature of the water over 100 degrees Celsius is aborted by the controller software component on the coffee maker. Another policy may limit the amount of coffee made in a given day. If the limit is reached, then the coffee maker may not be operated until cleaned or checked.

If a regulatory agency or commission issues new rules regarding the safety of coffee makers, then a user may download a policy update from an external server onto the coffee maker. One method of downloading the update is storing the update on flash memory that is connected to the coffee maker. The coffee maker could then run a program to look for new policies for its components. The policies would be translated into a language understandable by the software components within the coffee maker.

For example, the updates may lower the maximum temperature allowable for the coffee maker from 100 degrees Celsius to 90 degrees Celsius to better prevent burns and injuries. This "policy" is translated. The coffee maker then downloads the new policy in a readable format and updates its controller components accordingly. The next morning, a user sets the temperature to 95 degrees Celsius and the coffee maker interrupts the heating processing to abort heating to the requested temperature. Alternatively, the coffee maker may stop applying heat to the water when 90 degrees Celsius is reached. The policy of not heating water to above the new limit is enforced.

The above process with the coffee maker is achieved without returning the device to the manufacturer or store. Instead, users may download the updates from a website, or media storage such as a disk. The updates are fast and simpler that returning the entire device for a hardware fix.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

The invention claimed is:

1. A method for policy-based control of a device, the method comprising:
   generating an action on a device comprising a policy controller, the action comprising an instruction to transmit a radio signal from the device;
   collecting device state information for the device, the device state information describing one or more frequency states available for operation of the device in a radio frequency network;
   receiving, by the device and during continuous operation of the device, updated policy data relevant to the device from a source external to the device;
   based upon the updated policy data and subsequent to sending at least one prior radio signal transmission by the device within the radio frequency network, modifying, by the device and during continuous operation of the device, an existing policy configuration of the device to generate a modified policy;
   selecting one or more policies based upon the device state information, the one or more policies including the modified policy;
   evaluating the one or more policies related to the action;
   determining that transmission of the radio signal by the device is an allowable action according to the policies; and
   controlling execution of the action on the device with a policy enforcer of the controller according to the one or more policies, by controlling a radio to transmit or receive the radio signal.

2. The method of claim 1, further comprising determining that a precondition to performing the allowable action, the precondition being set by the policies, has been met.

3. The method of claim 1, wherein the step of controlling execution of the action on the device includes controlling execution of the action by the controller according to the device state information.

4. The method of claim 1, wherein the policies comprise a policy specified by a regulatory agency.

5. The method of claim 1, further comprising:
   determining that a first state of the device is a pre-approved state according to the selected one or more policies; and
   operating the device in the first device state.

6. The method of claim 1, wherein the device state information comprises an operational configuration of at least one component of the device selected from the group consisting of: a transmitter, a receiver, a signal detector, a location detector, a time detector, an owner of the device, and a certification.

7. The method of claim 6, wherein the operational configuration comprises at least one item selected from the group consisting of: a power of a transmitter, a frequency at which a transmitter is set, a frequency range within which a transmitter operates, a time, a location, and a history of collected decisions received from one or more detectors.

8. A method of configuring a radio for communication, the method comprising:
   constructing a request to identify an available frequency spectrum, the request including network environment information;
   comparing the request to a transmission frequency constraint described in a spectrum access policy;
   based on the comparison, identifying at least one candidate transmission frequency;
   translating the at least one candidate transmission frequency to at least one corresponding device state;
   configuring the radio for transmission at the candidate transmission frequency by placing the radio in the corresponding device state; and
   during continuous operation of the radio:
      executing a first command by the radio to transmit at the first candidate transmission frequency;
      receiving updated policy data from an external source;
      based upon the updated policy data and subsequent to executing the first command to transmit at the first candidate transmission frequency, modifying the spectrum access policy to generate a modified spectrum access policy; and
      responsive to a determination that a second command to be executed by the radio is not allowed by the modified spectrum access policy, preventing execution of the second command by the radio by interrupting the second command.

9. The method of claim 8, further comprising monitoring the candidate transmission frequency for non-cooperative signals, wherein the step of identifying the at least one candidate transmission frequency for transmission is further based on an absence of interfering non-cooperative signals at the candidate transmission frequency.

10. The method of claim 8, wherein the radio comprises a detector, the method further comprising configuring the detector to receive at the candidate transmission frequency.

11. The method of claim 8, wherein the request identifies a potential frequency transmission range based on measured frequency used within the potential frequency range.

12. The method of claim 8, wherein the policy defines a regulatory requirement for the candidate transmission frequency or a requirement for the candidate transmission frequency set by an operator of the radio.

13. The method of claim 8, further comprising verifying at least one of: the authorization of a sender of the updated policy data to issue the updated policy data; and the authenticity of the identity of the sender.

14. A device comprising:
   a tuner capable of transmitting at a plurality of frequencies;
   an optimizer configured to send a command to the tuner instructing the tuner to transmit within a selected frequency spectrum;
   a policy manager configured to receive updated policy data and, during operation of the tuner within the selected frequency spectrum, modify a policy restricting the frequencies at which the tuner is allowed to transmit and
   a controller, operating on the device, configured to operate the device to enforce the policy restricting the frequencies at which the tuner is allowed to transmit, the controller further comprising:
      a database storing the policy;
      a conformance reasoner configured to determine whether the command is allowed by the policy; and
      a policy enforcer configured to interrupt commands sent by the optimizer that violate the policy as determined by the conformance reasoner.

15. The device of claim 14, the controller further comprising a policy manager configured to validate a proposed modification of the policy.

16. The device of claim 15, the policy manager further configured to:

maintain a plurality of configuration modes, each configuration mode representing a set of policies applied to the device when the configuration mode is active; and provide an interface to allow an operator of the device to query the state of each configuration mode and to change the active configuration mode to one of the plurality of configuration modes.

17. The device of claim 15, wherein the policy defines regulatory requirements or requirements for the candidate transmission frequency set by an operator of the device.

18. The method of claim 1, further comprising:

subsequent to the step of controlling the execution of the action on the device with the controller according to the one or more policies, receiving, by the device, further updated policy data;

based upon the further updated policy data, modifying at least another existing policy configuration of the device to generate an additional modified policy; and controlling execution of an additional action on the device with the controller according to the additional modified policy.

19. The method of claim 8, further comprising:

identifying a missing parameter required to evaluate the request; and adding a constraint, based on the missing parameter, to the request.

* * * * *